(12) United States Patent
Tani et al.

(10) Patent No.: US 10,069,339 B2
(45) Date of Patent: Sep. 4, 2018

(54) WIRELESS POWER FEEDING METHOD AND WIRELESS POWER FEEDING DEVICE

(71) Applicant: Panasonic Corporation, Osaka (JP)

(72) Inventors: Hiroyuki Tani, Hyogo (JP); Kohichi Tanda, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 15/592,942

(22) Filed: May 11, 2017

(65) Prior Publication Data
US 2017/0353052 A1    Dec. 7, 2017

(30) Foreign Application Priority Data

Jun. 2, 2016    (JP) ................... 2016-111201

(51) Int. Cl.
| | |
|---|---|
| *H01F 27/42* | (2006.01) |
| *H01F 37/00* | (2006.01) |
| *H01F 38/00* | (2006.01) |
| *H02J 50/10* | (2016.01) |
| *H02J 7/02* | (2016.01) |
| *H02J 50/20* | (2016.01) |
| *H02J 50/40* | (2016.01) |

(Continued)

(52) U.S. Cl.
CPC ............. *H02J 50/10* (2016.02); *H02J 7/025* (2013.01); *H02J 50/20* (2016.02); *H02J 50/40* (2016.02); *H02J 50/80* (2016.02); *H02J 50/90* (2016.02)

(58) Field of Classification Search
CPC .. H02J 50/50; H02J 50/40; H02J 50/10; H02J 50/60; H02J 50/70; H02J 50/90; H02J 5/005; H02J 5/00; H02J 7/025; H01F 38/14

USPC .......... 307/149, 66, 64, 80; 455/67.1, 76, 86
See application file for complete search history.

(56) References Cited

U.S. PATENT DOCUMENTS 6,112,059 A * 8/2000 Schwent ............... H03F 3/1935
455/67.11
2006/0270440 A1 11/2006 Shearer et al.
(Continued)

FOREIGN PATENT DOCUMENTS

JP    2008-543255    11/2008
JP    2009-524398    6/2009
(Continued)

*Primary Examiner* — Rexford Barnie
*Assistant Examiner* — Jagdeep Dhillon
(74) *Attorney, Agent, or Firm* — Panasonic IP Management; Kerry S. Culpepper (57) ABSTRACT

A wireless power feeding method includes causing each of a plurality of power transmitters to acquire power amounts for power received by one or more of a power receptors which are targets for power transmission, determining a first power amount which is the smallest out of acquired power amounts, and adjusting a power transmission direction to be a direction in which the power received by the power receptor which has received the first power amount is maximum. Each of the plurality of power transmitters are caused to transmit power in the adjusted power transmission direction and leaked power amounts for leaked power, which is received by the power receptors that are the targets for power transmission of other power transmitters, are acquired as leaked power amounts to the power transmitters for which the targets for power transmission are the power receptors which receive the leaked power.

3 Claims, 8 Drawing Sheets (51) Int. Cl.
*H02J 50/80* (2016.01)
*H02J 50/90* (2016.01)

(56) References Cited

U.S. PATENT DOCUMENTS

| | | | |
|---|---|---|---|
| 2007/0178945 A1 | 8/2007 | Cook et al. | |
| 2007/0191074 A1 | 8/2007 | Harrist et al. | |
| 2008/0014897 A1 | 1/2008 | Cook et al. | |
| 2010/0109443 A1* | 5/2010 | Cook | H01Q 1/2225 307/104 |
| 2011/0050166 A1 | 3/2011 | Cook et al. | |
| 2011/0062791 A1 | 3/2011 | Shearer et al. | |
| 2013/0093255 A1* | 4/2013 | Jung | H02J 7/025 307/104 |
| 2015/0333801 A1* | 11/2015 | Hosotani | H01F 38/14 307/104 |
| 2016/0087456 A1* | 3/2016 | Shizuno | H01F 27/362 307/104 |
| 2016/0126753 A1 | 5/2016 | Wight et al. | |
| 2016/0141887 A1* | 5/2016 | Xue | H02J 50/12 307/104 |
| 2016/0181874 A1* | 6/2016 | Raveh | H02J 5/005 307/104 |
| 2016/0190816 A1* | 6/2016 | Rehm | H02J 5/005 307/104 |
| 2016/0248470 A1* | 8/2016 | Kunihiro | H03F 3/217 |

FOREIGN PATENT DOCUMENTS

| | | |
|---|---|---|
| JP | 2014-223018 | 11/2014 |
| JP | 2016-066960 | 4/2016 |
| WO | 2012/027166 | 3/2012 |

\* cited by examiner

PRIOR ART

WIRELESS POWER FEEDING METHOD AND WIRELESS POWER FEEDING DEVICE

BACKGROUND

1. Technical Field

The present disclosure relates to a wireless power feeding method and a wireless power feeding device which transmit power wirelessly using electromagnetic waves (micro waves).

2. Description of the Related Art

In recent years, there has been progress in the development of techniques for transferring power using electromagnetic waves and feeding power wirelessly. As an example of the wireless power feeding techniques using electromagnetic waves, there is a method using electromagnetic waves of a frequency band which is from several hundred kHz to several MHz and using coupling or resonance of magnetic fields over short distances of several meters or less such as electromagnetic induction or magnetic resonance.

In addition, there is a system using micro waves as a wireless power transfer method in cases where the distance from the power transmission device to the power reception device is far. It is possible to transfer power to a power reception device which is far away using a beam of micro waves which are from several hundred MHz to several GHz. As an example of the wireless power transfer system, there is a cosmic solar light power generation system where a satellite mounted with a solar light panel is launched to above the equator and the power generated using the solar light is transmitted to a power reception device on earth, a system where the power is transmitted to a power reception device disposed on a remote island, and the like.

The power transfer method using micro waves in this manner has characteristics such that freedom in terms of the distance for transmitting power is high compared to other methods, and it is possible to use power feeding using micro waves as the power source over relatively short distances for electric vehicles, robots, or various wireless terminals. In particular, a method is suggested, with the aim that it will not be necessary to charge a sensor or mobile device or replace batteries using power of a level of several mW to several W, such that micro waves are radiated onto the device disposed in space to feed power wirelessly.

However, since power feeding using micro waves involves radiating radio waves into space, there is a problem in that it is difficult to recover and use all of the radiated power and efficiency is low. In contrast, a method is proposed such that information is communicated between the power transmission system and the device which is on the side for receiving power, a path able to most efficiently transmit power through space is calculated, and micro waves are transmitted in this direction (Japanese Patent Unexamined Publication No. 2014-223018).

Figure 8:
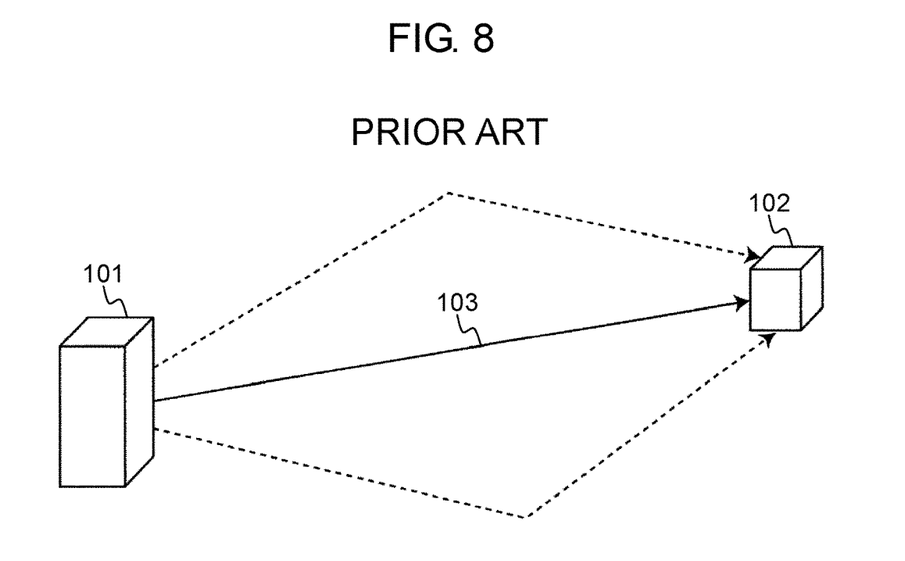
FIG. 8 is a diagram for describing the wireless power feeding method in the related art.

FIG. 8 is a diagram illustrating the micro wave power feeding method in the related art. Efficient power transmission is realized by power transmitter 101 transmitting micro waves to power receptor 102, path 103 able to most efficiency transmit power being calculated, and the power transmission direction for the micro waves being controlled to be a direction which passes along path 103.

SUMMARY

A wireless power feeding method according to one aspect of the present disclosure is for transferring power between a plurality of power transmitters and a plurality of power receptors, the method comprising causing each of the plurality of power transmitters to acquire power amounts for power received by one or more of the power receptors which are targets for power transmission, determining a first power amount which is the smallest out of the acquired power amounts, and adjusting a power transmission direction to be a direction in which the power received by the power receptor which has received the first power amount is maximum. Each of the plurality of power transmitters are caused to transmit power in adjusted power transmission direction and leaked power amounts for leaked power, which is received by the power receptors that are the targets for power transmission of other power transmitters, are acquired as leaked power amounts to the power transmitters for which the targets for power transmission are the power receptors which receive the leaked power. The plurality of power transmitters are caused to transmit power in the adjusted power transmission directions after the adjustment of the power transmission directions and the acquisition of the leaked power amounts have been performed for all of the plurality of power transmitters. In two power transmitters of the power transmitter transmitting leaked power and the power transmitter for which the target for power transmission is the power receptors which receives the leaked power, sequentially from the power transmitter with the largest leaked power amount, the power amounts for the power, which is received by the power receptors which are the target for power transmission of the two power transmitters are acquired, a second power amount which is the smallest from among the acquired power amounts is determined, and a phase of power transmission radio waves for either one of the two power transmitters to a phase in which the power received by the power receptor which has received the second power amount is maximum.

The wireless power feeding method according to this aspect of the present disclosure is such that wireless power feeding is possible without the power transmission radio waves from the plurality of power transmitters interfering with each other.

DETAILED DESCRIPTION

Prior to describing an embodiment, the problems with the techniques in the related art will be simply described.

There is a problem in the wireless power feeding methods in the related art in that, assuming use over a wide space, the radio waves attenuate and the efficiency is reduced with a single power transmitter due to separation of the distance between the power transmitter and the power receptor. In addition, in an environment where there are a plurality of the power receptors, it is necessary to sequentially switch between paths for the single power transmission path, and it is difficult to continuously feed power. Accordingly, in wireless power feeding to multiple power receptors in a wide space, it is necessary to dispose a plurality of the power transmitters and control the power transmission direction of each of the power transmitters to be a direction such that efficient power transmission to the plurality of power receptors is possible so as to solve the problem of the interference of radio waves from each of the power transmitters due to the plurality of power transmitters being disposed.

The object of the present disclosure is to propose a wireless power feeding method such that wireless power feeding is possible by efficiently transmitting power to a plurality of power receptors using a plurality of power transmitters without the power transmission radio waves from the plurality of power transmitters interfering with each other.

An embodiment will be described below with reference to the drawings.

1. Overall Configuration

Figure 1:
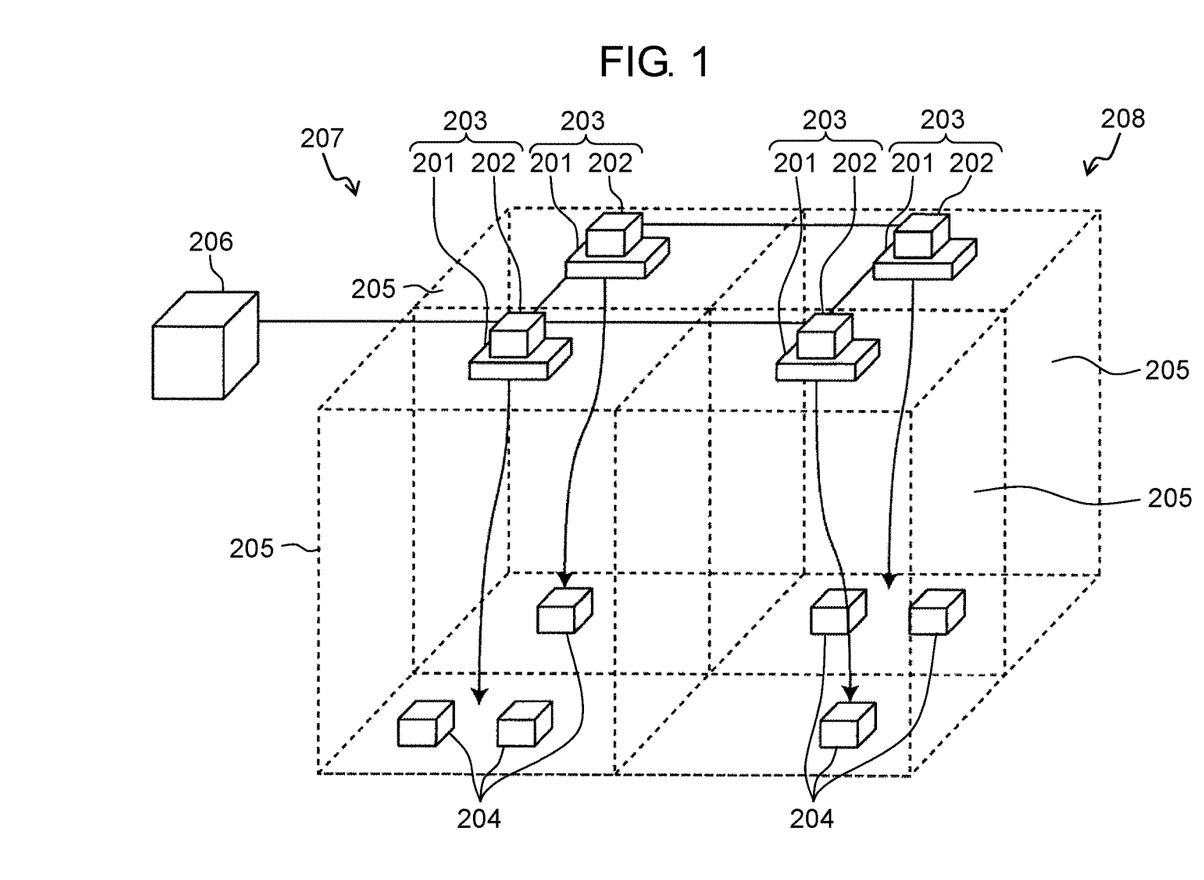
FIG. 1 is a diagram for diagrammatically describing a wireless power feeding method according to an embodiment.

FIG. 1 is a diagram for describing the wireless power feeding method according to the present embodiment. The wireless power feeding method is such that power is transferred between a plurality of power transmitters 203 and a plurality of power receptors 204.

Each of power transmitters 203 is configured by power transmission antenna 201 for radiating micro waves and oscillation controller 202 for generating the micro waves and controlling the phase and the power transmission direction of the micro waves. All of power transmitters 203 are connected to management portion (a wireless power feeding controller) 206 and configure power transmission system 207.

In addition, the plurality of power receptors 204 which are the targets for the power transmission by each of power transmitters 203 receive the radio waves radiated from any of power transmitters 203 in power transmission system 207, convert the radio waves into direct current power, and then utilize the direct current power as an own power source or as power for charging a battery.

In addition, in the present embodiment, there are a plurality of power transmitters 203, and power transmitters 203 are arranged in a grid formation as an example and each have power transmission range 205. Here, power transmission ranges 205 are illustrated as rectangular cubic shapes for ease of understanding, but are not limited thereto.

In addition, the plurality of power receptors 204 are arranged at arbitrary positions within power transmission ranges 205 of each of power transmitters 203. The location and number of power receptors 204 are not known and each of power receptors 204 has unique ID information. The ID information and the power amount received when receiving the radio waves radiated from each of power transmitters 203 are able to be transferred to each of power transmitters 203 using wireless communication. Each of power transmitters 203 transfers data acquired from each of power receptors 204 to management portion 206.

Management portion 206 sequentially determines power transmitters 203 to be adjusted based on the information acquired from all of power transmitters 203 and controls the following actions for adjusting determined power transmitters 203.

2. Overall Flow of Adjustment Method

Figure 2:
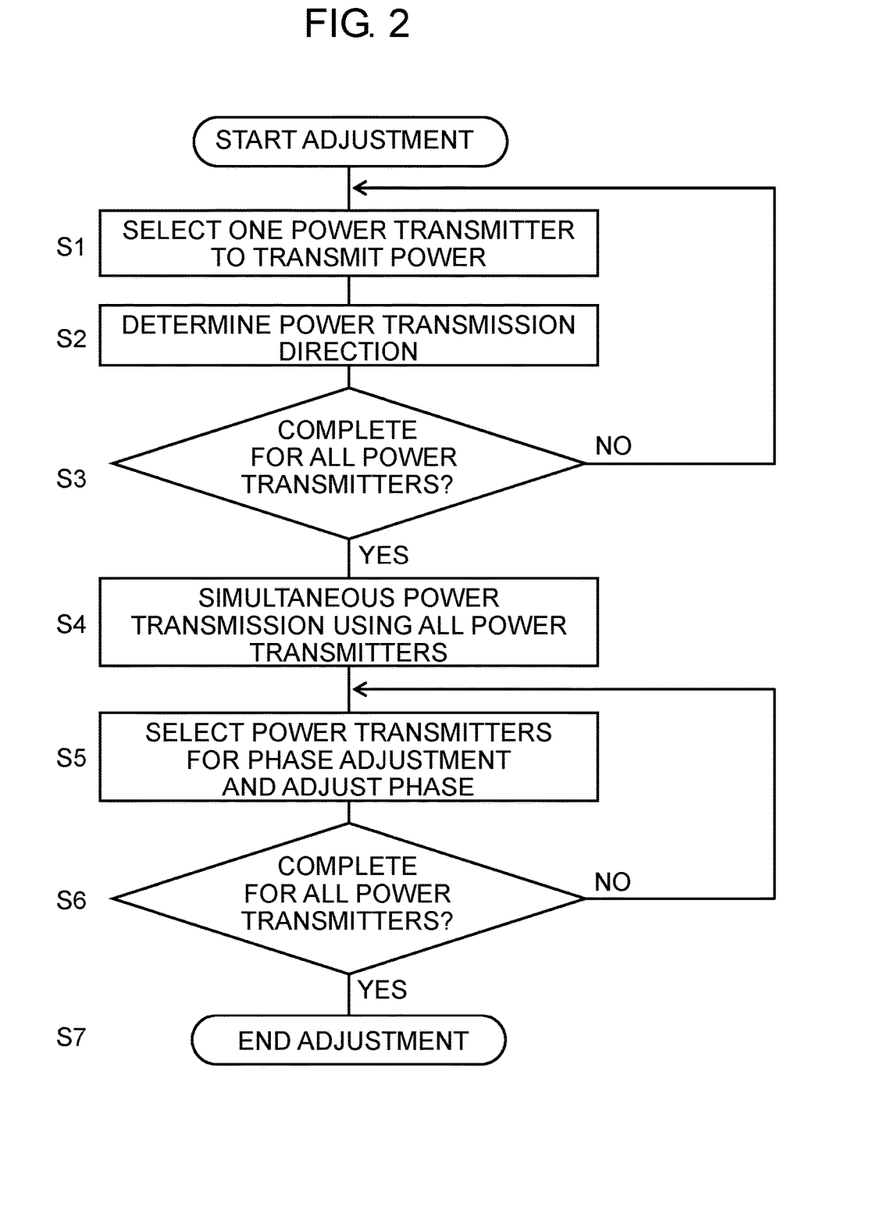
FIG. 2 is a flow chart for a wireless power feeding method according to an embodiment.

The flow for an adjustment method is indicated in FIG. 2. These actions are basically executed on the basis of the management (control) by management portion 206.

First, under the control of management portion 206, each of power transmitters 203 transmits power in a state in which power transmission by other power transmitters 203 is stopped, that is, a state in which there is power transmission using just one of power transmitters 203 (step S1).

Next, under the control of management portion 206, the power transmission direction is determined for power transmitter 203 in the power transmission state in step S1. Then, the power transmission directions of all of power transmitters 203 are determined while sequentially switching between power transmitters 203 which are transmitting power (step S2).

Next, under the control of management portion 206, after the power transmission directions of all of power transmitters 203 are determined (Yes in step S3), overall power transmission is performed using all of power transmitters 203 (step S4), power transmitters 203 for which the phase is to be adjusted are selected, phase adjustment is sequentially performed (step S5 and step S6), and phase adjustment for all of power transmitters 203 is completed (step S7).

3. Steps S1 to S3: Method for Determining Power Transmission Direction

First, a method for determining the power transmission direction will be described. As described beforehand, in the determination of the power transmission direction, each of power transmitters 203 transmits power using one of power transmitters 203 in a state in which power transmission by each of other power transmitters 203 is stopped (step S1). Then, for each power transmission by one power transmitter 203, each of the power transmitters 203 recognizes corresponding power receptors 204 and determines the power transmission direction while acquiring the received power amount (step S2). In this method, power transmitters 203 perform power transmission over power transmission range 205 in a direction to pass through the center of power transmission range 205, wirelessly acquire the ID information of power receptor 204 and the power amount for the power received by power receptor 204 from power receptor 204, and transfer this information to management portion 206.

This is performed in sequence with regard to all of power transmitters 203 under the control of management portion 206, and respective corresponding power transmitters 203 are specified for recognized power receptors 204 by management portion 206 (step S3). Management portion 206 associates power receptors 204 that are recognized by the plurality of power transmitters 203 with power transmitter 203 which maximizes the received power amount.

Thereby, management portion 206 associates one or a plurality of power receptors 204 with each of power transmitters 203. Management portion 206 does not perform power transmission and does not perform the subsequent adjustment for power transmitters 203 for which none of power receptors 204 are associated with. A method for associating the power transmitters and the power receptors will be described below in detail.

3-1. Association of Power Transmitters and Power Receptors

For example, specifically, a case will be described such that, under the control of management portion 206, power receptors 306, 307, 406, and 407 are recognized by and associated with two power transmitters 303 and 403 using FIG. 3 and FIG. 4 as an example of power transmitters 203 and power receptors 204 indicated in FIG. 1.

Figure 3:
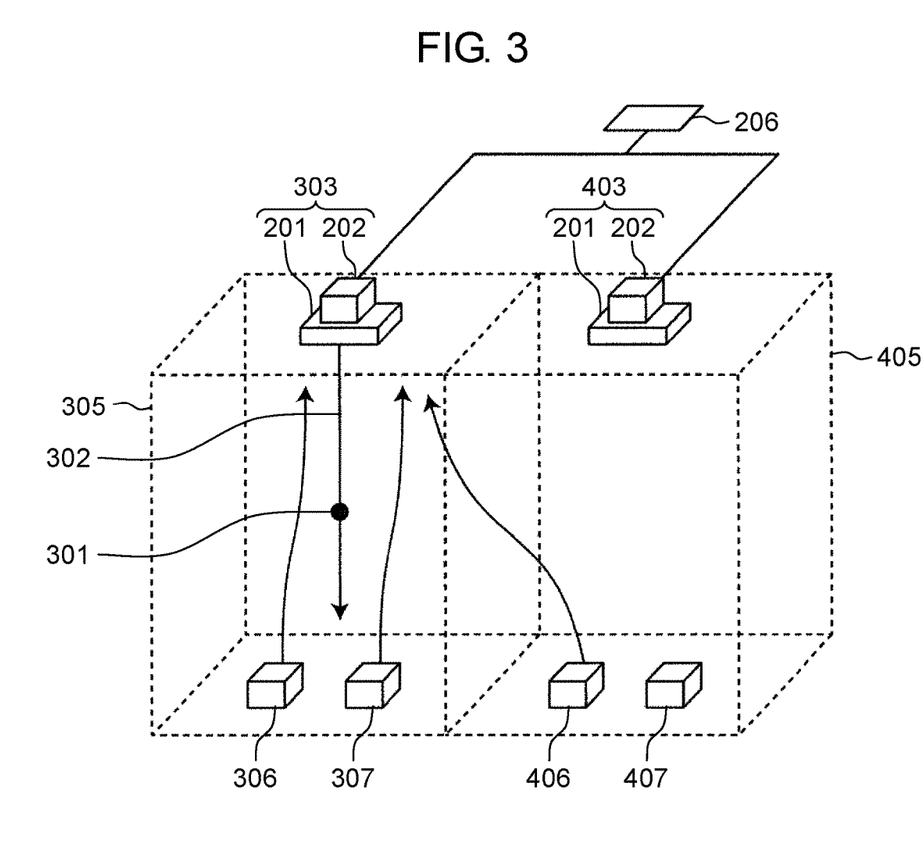
FIG. 3 is a diagram for describing a method for recognizing a power receptor corresponding to a power transmitter according to an embodiment.

In FIG. 3, in a case where power transmission is performed by power transmitter 303, power transmitter 303 performs power transmission in power transmission direction 302 which passes through center 301 of power transmission range 305 and acquires the ID information and the received power amount from power receptors 306, 307, and 406.

Figure 4:
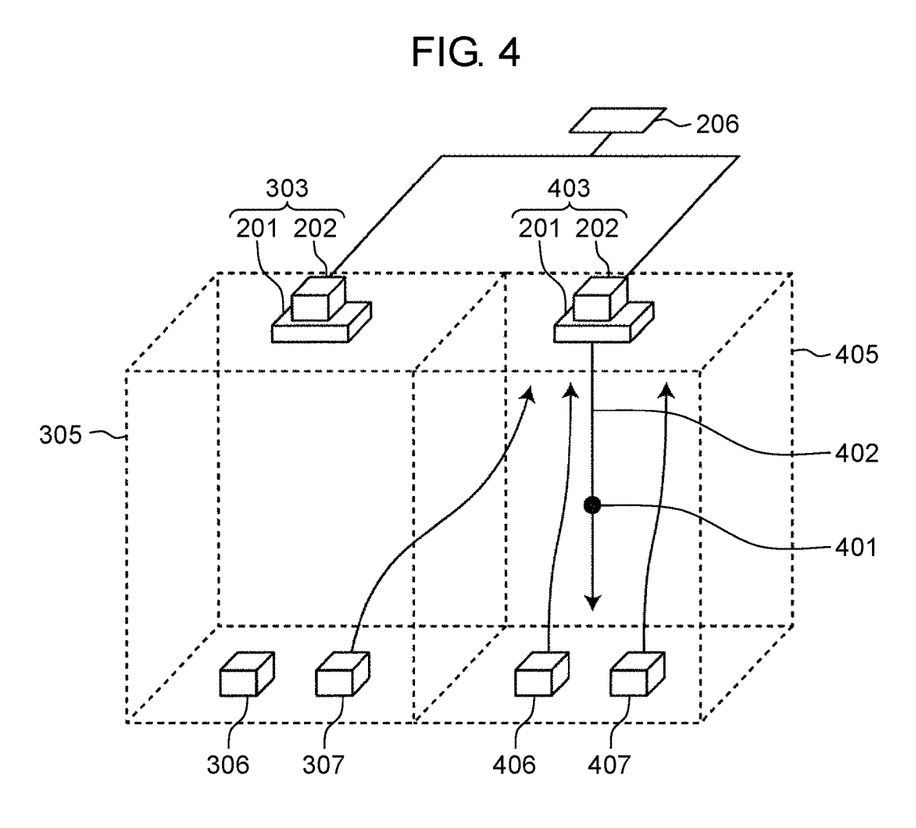
FIG. 4 is a diagram for describing a method for recognizing a power receptor corresponding to a power transmitter according to an embodiment.

FIG. 4 illustrates a case where power transmission is performed by power transmitter 403, power transmitter 403 performs power transmission in power transmission direction 402 which passes through center 401 of power transmission range 405 and acquires the ID information and the received power amount from power receptors 307, 406, and 407. In this case, power receptor 306 is only recognized by power transmitter 303 and is associated with power transmitter 303. In addition, power receptor 407 is only recognized by power transmitter 403 and management portion 206 associates power receptor 407 with power transmitter 403. Meanwhile, power receptors 307 and 406 are recognized from both of power transmitter 303 and power transmitter 403, but in a case where the power amount for the power received by power receptor 307 is compared using the power transmission from power transmitter 303 and the power transmission from power transmitter 403, the power from power transmitter 303 is larger since power receptor 307 is disposed at a position close to power transmitter 303, and power receptor 307 is associated with power transmitter 303. In the same manner, in a case where the power transmission from the power transmitter 303 and the power transmission from power transmitter 403 is compared for power receptor 406, the power transmission from power transmitter 403 is larger since power receptor 406 is arranged at a position close to power transmitter 403, and management portion 206 associates power receptor 406 with power transmitter 403.

As a result, in management portion 206, the power receptors associated with power transmitter 303 are power receptors 306 and 307, and the power receptors associated with power transmitter 403 are power receptors 406 and 407. This time, a case where there are two of the power transmitters is described as an example, but association is performed using the same method even if the number of the power transmitters increases. A method for determining the power transmission direction based on the association relationships in steps S1 to S3 will be described below in detail.

3-2. Method for Determining Power Transmission Direction Based on Association Relationships Next, a method for determining the power transmission direction with the association relationships under the control of management portion 206 will be described.

In FIG. 1, there is a method such that power transmitters 203 wirelessly acquire the power amounts for the received power for associated power receptors 204, management portion 206 compares the power amounts for the power received by power receptors 204, management portion 206 determines the smallest power amount, and management portion 206 determines the power transmission directions by management portion 206 adjusting the power transmission directions to be directions where the smallest power amounts are maximized.

Figure 5:
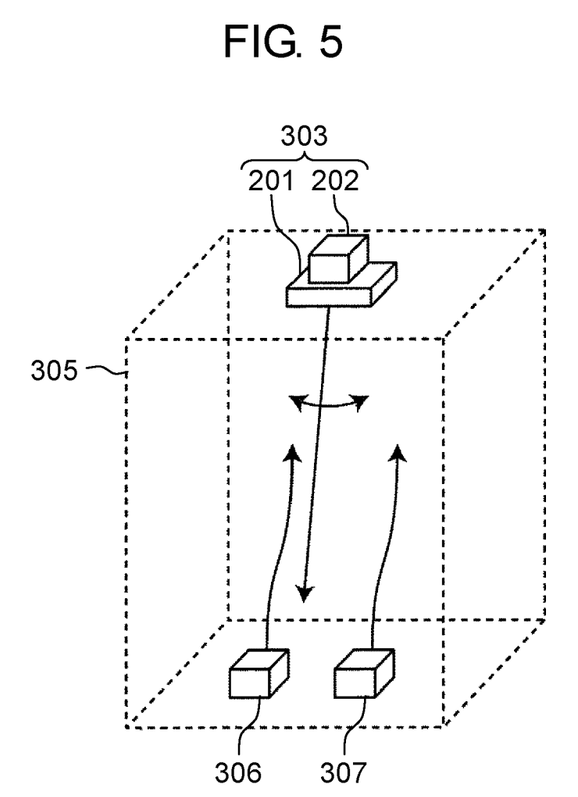
FIG. 5 is a diagram for describing a method for determining a power transmission direction according to an embodiment.

For example, FIG. 5 is a diagram describing a method for determining the power transmission direction for power transmitter 303. Power transmitter 303 performs power transmission and wirelessly acquires the power amount for the power received by power receptor 306 and the power amount for the power received by power receptor 307, management portion 206 determines the smallest power amount from among the acquired power amounts (the first power amount as in the present disclosure which is the same in the following description regarding steps S1 to S3), and management portion 206 adjusts the power transmission direction using oscillation controller 202 of power transmitter 303 so as to maximize the power received by the power receptor receiving the smallest power amount. For example, when the smallest power amount determined by management portion 206 relates to power receptor 306, the power transmission direction of power transmitter 303 is adjusted so as to maximize the power amount transmitted from power transmitter 303 to power receptor 306. Then, while the power transmission direction of power transmitter 303 is being adjusted, management portion 206 determines the power transmission direction so as to maximize the smaller power amount. By this process being sequentially performed by management portion 206 for the other power transmitters, management portion 206 determines the power transmission directions for all of the power transmitters.

That is, determination of the power transmission direction in FIG. 1 is performed by each of the plurality of power transmitters 203 acquiring the power amounts for the power received by one or more of power receptors 204 which are the targets for power transmission, determining the first power amount which is the smallest among the acquired power amounts, and adjusting the power transmission direction to a direction in which the power received by power receptor 204 which has received the first power amount is maximum. In addition, determination of the power transmission direction in FIG. 5 is performed by power transmitter 303 acquiring the power amount for the power received by power receptor 306 and power receptor 307 which are the targets for power transmission, determining the first power amount which is the smallest among the acquired power amounts, and adjusting the power transmission direction to a direction in which the power received by power receptor 306 which has received the first power amount is maximum.

4. Steps S4 to S6: Method for Adjusting Phase

Next, a method for adjusting the phase under the control of management portion 206 will be described. It is assumed that the phases of the power transmission radio waves from each of power transmitters 203 will overlap in a state of power transmission by all of power transmitters 203 (step S4) in FIG. 1, and there is a possibility that the power received by power receptors 204 will be reduced due to weakening from combining of the phases. In order to avoid this state, management portion 206 adjusts the phase for each of power transmitters 203 using oscillation controller 202 of power transmitter 303, and management portion 206 performs adjustment to a state such that efficient power transmission is possible for all of the power transmitters.

In this method, management portion 206 selects two of power transmitters 203 for which the phases are to be adjusted in a state of power transmission by all of power transmitters 203 (step S4) in FIG. 1, and management portion 206 acquires the power amounts for the power received by power receptor 204 corresponding to the two power transmitters 203. Then, management portion 206 compares the two power amounts related to the power received by power receptors 204 from two power transmitters 203, management portion 206 determines the smallest power amount (the second power amount as in the present disclosure which is the same in the following description regarding steps S4 to S6), and management portion 206 adjusts the phase for one out of two power transmitters 203 using oscillation controller 202 of power transmitter 203 such that the smallest power amount takes on a maximum value.

Figure 6:
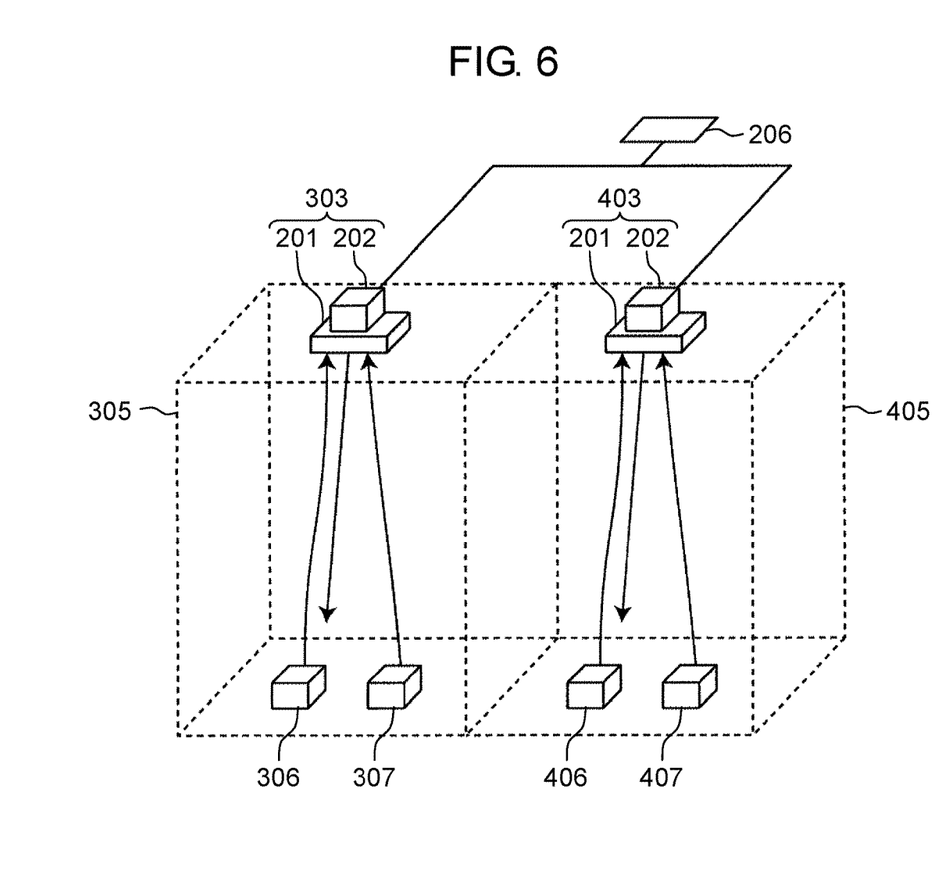
FIG. 6 is a diagram for describing a phase adjustment method according to an embodiment.

For example, in the case of FIG. 6, power transmission is performed by two power transmitters 303 and 403, and the four power amounts related to the power received by each of power receptors 306, 307, 406, and 407 are wirelessly acquired. Management portion 206 compares the four power amounts, management portion 206 acquires the smallest power amount, and management portion 206 adjusts the phase of power transmitter 303 or power transmitter 403 so as to maximize the smallest power amount. Due to this adjustment, the phase adjustment for two power transmitters 303 and 403 is complete, and beyond this, the phases are fixed and do not change. Due to management portion 206 sequentially selecting the two power transmitters in FIG. 1 and management portion 206 performing phase adjustment in this manner, it is possible for management portion 206 to complete the phase adjustment for all of power transmitters 203. Here, the two power transmitters for which the phase is to be adjusted are sequentially selected from the power transmitter for which the leaked power amount is the largest (a method for acquiring the leaked power amounts will be described in detail later). In addition, for power transmitter 203 for which the adjustment is already complete out of two power transmitters 203 selected by management portion 206, adjustment is not performed, management portion 206 adjusts the phase of power transmitter 203 for which adjustment is not complete, and management portion 206 does not perform adjustment in the case where phase adjustment is complete for both of two selected power transmitters 203.

That is, the phase adjustment in FIG. 1 is performed as follows. First, with adjustment of the power transmission directions and acquisition of the leaked power amounts for all of the plurality of power transmitters 203 having been performed (the details will be described later), power transmission is performed from the plurality of power transmitters 203 in the adjusted power transmission directions. Then, in two power transmitters 203 of power transmitter 203 which transmits leaked power and power transmitter 203 for which the target for power transmission is power receptor 204 which receives the leaked power, sequentially from power transmitter 203 with the largest leaked power amount, the power amounts for the power, which is received by power receptors 204 that are targets for power transmission of two power transmitters 203 are acquired. Then, determining the second power amount which is the smallest from among the acquired power amounts and adjusting a phase for power transmission radio waves for either one of two power transmitters 203 to a phase in which the power received by power receptor 204 which has received the second power amount is maximum.

Here, a method for acquiring the leaked power amounts necessary for selection of two of the power transmitters in step S5 will be described in detail below.

4-1. Method for Acquiring Leaked Power Amounts Necessary for Selection of Two Power Transmitters The method for acquiring the leaked power amounts necessary for selection of two of power transmitters 203 in step S5 under the control of management portion 206 in FIG. 1 will be described. In this method, it is possible for management portion 206 to acquire information on the leaked power amount to nearby power receptors 204 through the effects on power receptors 204 other than power receptor 204 which is the target for power transmission, that is, by each of power transmitters 203 acquiring the power amounts for the power received by nearby power receptors 204 when each of power transmitters 203 transmits power in the power transmission direction determined in step S2. Management portion 206 acquires the leaked power amounts and management portion 206 performs phase adjustment with priority given to phase adjustment between power transmitter 203 with a large leaked power amount and power transmitters 203 corresponding to power receptor 204 receiving the leaked power. In the method for acquiring the leaked power, due to management portion 206 causing each of power transmitters 203 to perform power transmission in the power transmission direction determined in step S2 in a state where power transmission by other power transmitters 203 is stopped, and management portion 206 acquiring the ID information of power receptors 204 and the power amount for the power received by power receptors 204 other than power receptor 204 corresponding to power transmitter 203, it is possible for management portion 206 to acquire the leaked power from power transmitter 203 to specific power receptor 204. By management portion 206 executing this for all of power transmitters 203, it is possible for management portion 206 to acquire the information on the leaked power amounts to power receptors 204 other than corresponding power receptor 204 for all of power transmitters 203.

Figure 7:
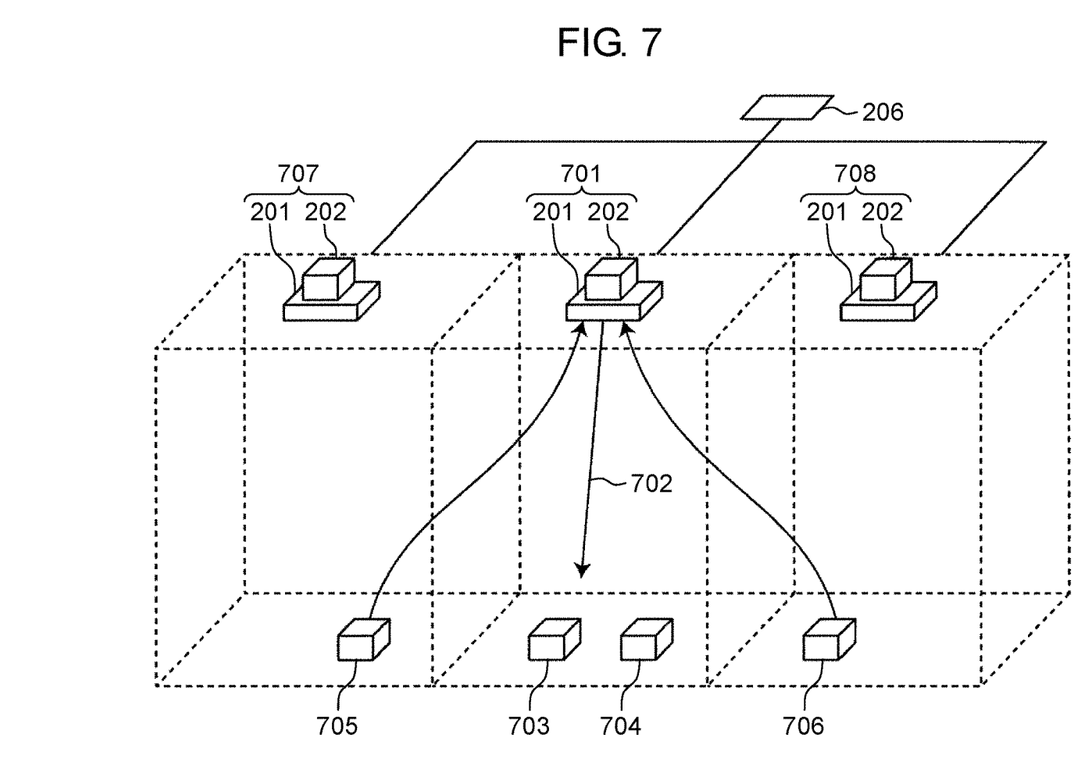
FIG. 7 is a diagram for describing a method for acquiring leaked power of another unit according to an embodiment.

For example, in the case of FIG. 7, management portion 206 causes power transmitter 701 to perform power transmission in power transmission direction 702 determined in step S2, and there is a search for a power receptor for which it is possible to acquire a power amount other than power receptors 703 and 704 which are targets for power transmission from power transmitter 701, and management portion 206 acquires the power amount and the ID information of the power receptor. In this case, management portion 206 acquires the power amounts and the ID information of power receptors 705 and 706. Note that, power transmitters 707 and 708 are examples of power transmitter 203, and power receptors 705 and 706 are examples of power receptor 204. Management portion 206 stores the power amount for the power received by power receptor 705 as the leaked power amount from power transmitter 701 to power transmitter 707 for which power receptor 705 is the target for power transmission. In the same manner, management portion 206 stores the power amount for the power received by power receptor 706 as the leaked power amount from power transmitter 701 to power transmitter 708 for which power receptor 706 is the target for power transmission. Here, management portion 206 compares the stored leaked power amount from power transmitter 701 to power transmitter 707 and the stored leaked power amount from power transmitter 701 to power transmitter 708, management portion 206 selects the two power transmitters of power transmitter 701 and power transmitter 707 if management portion 206 determines that the leaked power amount from power transmitter 701 to power transmitter 707 is larger, and management portion 206 adjusts the phase of power transmitter 701 or power transmitter 707. Conversely, management portion 206 selects the two power transmitters of power transmitter 701 and power transmitter 708 if management portion 206 determines that the leaked power amount from power transmitter 701 to power transmitter 708 is larger, and management portion 206 adjusts the phase of power transmitter 701 or power transmitter 708. Management portion 206 performs this process for all of the power transmitters, management portion 206 holds relationships regarding the leaked power between the power transmitters as data, and management portion 206 performs phase adjustment with priority given between power transmitters where the leaked power is large. As the timing for acquiring the leaked power amount, the acquisition may be carried out in combination at timings for determining the power transmission direction for each of the power transmitters in step S2 or the acquisition may be carried out separately after this.

That is, the acquisition of the leaked power amounts in FIG. 1 is performed by each of the plurality of power transmitters 203 transmitting power in the power transmission direction adjusted in step S2, and the leaked power amount for the leaked power received by power receptor 204 which is the target for power transmission for another power transmitter 203 being acquired as the leaked power amount to power transmitter 203 for which power receptor 204 receiving the leaked power is the target for power transmission.

5. Conclusion

According to the wireless power feeding method according to the embodiment, under the control of management portion 206, the plurality of power transmitters 203 wirelessly acquire the power amounts for the power received by power receptors 204, the power transmission direction to a direction so as to maximize the received power is adjusted, and it is possible to reduce the interference between the radio waves of the plurality of power transmitters 203 by the phase being adjusted. As a result, power is efficiently transmitted to the plurality of power receptors 204 using the plurality of power transmitters 203, and wireless power feeding is possible without the power transmission radio waves from the plurality of power transmitters 203 interfering with each other. Consequently, efficient wireless power transfer is possible by disposing the plurality of power transmitters 203 with regard to the plurality of power receptors 204 disposed over a wide range.

Wireless power feeding system 208 able to realize the wireless power feeding method is provided with the plurality of power transmitters 203, the plurality of power receptors 204, and management portion (wireless power feeding controller) 206 for controlling power transfer between the plurality of power transmitters 203 and the plurality of power receptors 204. Management portion 206 controls the following actions causing the plurality of power transmitters 203 to acquire the power amounts for the power received by one or more of power receptors 204 which are the targets for power transmission over respective power transmission ranges 205, determining the power amount which is the smallest out of the acquired power amounts, adjusting the power transmission direction to be a direction so as to maximize the determined smallest power amount, transmitting power in the adjusted power transmission direction, acquiring the leaked power amounts for the leaked power, which is received by power receptors 204 which are the targets for power transmission of other power transmitters 203, performing power transmission in the adjusted power transmission direction after the adjustment of the power transmission direction and acquisition of the leaked power amounts have been performed for all of the plurality of power transmitters 203, and in two power transmitters 203 of power transmitter 203 which transmits leaked power and power transmitter 203 for which the targets for power transmission are power receptors 204 which receive the leaked power, sequentially from power transmitter 203 with the largest leaked power amount, acquiring the power amount for power that is received by power receptors 204 which are the targets for power transmission of two power transmitters 203, determining the power amount which is the smallest from among the acquired power amounts, and adjusting the phase of the power transmission radio waves for either of two power transmitters 203 to a phase which maximizes the determined smallest power amount.

In this manner, according to wireless power feeding system 208, it is possible to execute the wireless power feeding method and it is possible to achieve the actions and effects described above.

Note that, it is possible to achieve the effects of each of the embodiments and modified examples by appropriately combining arbitrary embodiments or modified examples out of the various embodiments and modified examples. In addition, combination of the embodiments, combination of the examples, and combination of the embodiments and the examples are possible, and combination of the characteristics from different embodiments and examples is possible.

The wireless power feeding method according to this aspect of the present disclosure is the wireless power feeding method for realizing efficient wireless power feeding to the plurality of power receptors disposed over a wide area in an environment disposed with the plurality of power transmitters, and thus, is a method able to be utilized as means for supplying a power source to sensors in a case where a network is constructed using a multiple sensors.

What is claimed is:

1. A wireless power feeding method for transferring power between a plurality of power transmitters and a plurality of power receptors, the method comprising:
   causing each of the plurality of power transmitters to acquire power amounts for power received by one or more of the power receptors which are targets for power transmission;
   determining a first power amount which is the smallest out of the acquired power amounts;
   adjusting a power transmission direction to be a direction in which the power received by the power receptor which has received the first power amount is maximum;
   causing each of the plurality of power transmitters to transmit power in adjusted power transmission direction;
   acquiring leaked power amounts for leaked power, which is received by the power receptors that are the targets for power transmission of other power transmitters, as leaked power amounts to the power transmitters for which the targets for power transmission are the power receptors that receive the leaked power;
   causing the plurality of power transmitters to transmit power in the adjusted power transmission directions after the adjustment of the power transmission directions and acquisition of the leaked power amounts have been performed for all of the plurality of power transmitters; and
   in two power transmitters of the power transmitter transmitting leaked power and the power transmitter for which the target for power transmission is the power receptor which receives the leaked power, sequentially from the power transmitter with the largest leaked power amount, acquiring the power amounts for the power, which is received by the power receptors that are the target for power transmission of the two power transmitters, determining a second power amount which is the smallest from among acquired power amounts, and adjusting a phase of power transmission radio waves for either one of the two power transmitters to a phase in which the power received by the power receptor which has received the second power amount is maximum.

2. The wireless power feeding method of claim 1,
wherein the power transmitters transmit radio waves in a direction through a center of a power transmission range, acquire the power amounts received by the power receptors, and determine the power receptors which are the targets for power transmission from the acquired power amounts.

3. A wireless power feeding device comprising:
a plurality of power transmitters for transmitting power to a plurality of power receptors and acquiring power amounts received by one or more of the power receptors which are targets for power transmission over respective power transmission ranges; and
a management portion connected to the plurality of power transmitters,
wherein the management portion determines a first power amount which is the smallest out of the power amounts for the power received by one or more of the power receptors which are the targets for power transmission, power amounts being acquired by each of the plurality of power transmitters,
   adjusts a power transmission direction of the power transmitters to be a direction in which the power received by the power receptor which has received the first power amount is maximum,
   causes each of the plurality of power transmitters to transmit power in adjusted power transmission direction,
   acquires leaked power amounts for leaked power, which is received by the power receptors that are the targets for power transmission of other power transmitters, as leaked power amounts to the power transmitters for which the targets for power transmission are the power receptors that receive the leaked power,
causes the plurality of power transmitters to transmit power in the adjusted power transmission directions after the adjustment of the power transmission directions and acquisition of the leaked power amounts have been performed for all of the plurality of power transmitters, and
in two power transmitters of the power transmitter transmitting leaked power and the power transmitter for which the target for power transmission is the power receptor which receives the leaked power, sequentially from the power transmitter with the largest leaked power amount, acquires the power amounts for the power, which is received by the power receptors that are the target for power transmission of the two power transmitters, determines a second power amount which is the smallest from among acquired power amounts, and adjusts a phase of power transmission radio waves for either one of the two power transmitters to a phase in which the power received by the power receptor which has received the second power amount is maximum.

* * * * *